Feb. 20, 1945. R. F. E. STEGEMAN 2,369,761
OPTICAL INSTRUMENT
Filed April 7, 1943

RAYMOND F. E. STEGEMAN
INVENTOR
BY
ATTORNEYS

Patented Feb. 20, 1945

2,369,761

UNITED STATES PATENT OFFICE 2,369,761

OPTICAL INSTRUMENT

Raymond F. E. Stegeman, Rochester, N. Y., assignor to Bausch & Lomb Optical Company, Rochester, N. Y., a corporation of New York Application April 7, 1943, Serial No. 482,087

3 Claims. (Cl. 88—41)

The present invention relates to optical instruments and more particularly to a loupe with means for supporting the same from a spectacle lens.

Numerous types of loupes have been used heretofore, wherein a loupe has been held in front of the eye of a user by supporting means mounted on the lens of a spectacle worn by the user. As the magnifying lens of these prior loupes is rigidly fixed to the supporting means, it is necessary to remove the supporting means when the loupe is no longer needed, and to replace the supporting means on the spectacle lens when the user again requires the use of the loupe. This continual removal and replacement of the supporting means is not only inconvenient but many times scratches the spectacle lens necessitating its replacement.

In the device of the present invention, a loupe is pivotally attached to the supporting means so that the loupe can be moved from an operative position in front of the eye of the user to an inoperative position overlying the eye, without necessitating the removal of the supporting means. In this manner, scratches on the spectacle lens may be avoided and the magnifying lens conveniently located for optional employment by the user.

In the embodiment of the invention now preferred, the supporting means comprises a pair of spaced substantially circular wires of resilient material adapted to engage opposite faces of a spectacle lens. The adjacent ends of one of the wires form hinge pins adapted to be resiliently held in suitable openings shaped in the loupe holding member. As the ends of the wires are resiliently held in the openings, they can be removed from the latter by merely urging the same apart. Thus, similar loupes of variant magnifications can be substituted in the supporting means, as well as any loupes having suitable openings in their lens holding means, by detaching one loupe and replacing it with another.

The present invention also contemplates means for holding a loupe in a desired position relative to the supporting means. To secure this result, friction surfaces are provided on the hinge pins formed by the adjacent ends of the one wire of the supporting means, which surfaces are resiliently held in frictional engagement with the loupe holder.

One object of the invention is to provide means for detachably securing a loupe with an eyeglass or spectacle frame.

Another object of the invention is to provide hinge means by which a loupe may be pivotally attached to an eyeglass or spectacle frame.

A further object of the invention is to provide means for holding a loupe in any desired position with respect to an eyeglass or spectacle frame.

Other objects and advantages reside in certain novel features of construction, arrangement and combination of parts as will hereinafter be more fully described and pointed out in the appended claims.

Figure 1:
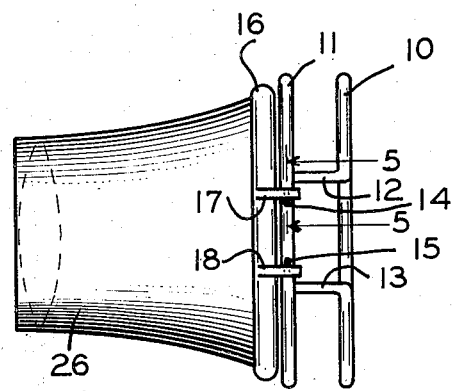
Fig. 1 is a top plan view of the device applied to a loupe.

Referring to the drawing, there is shown a loupe supporting member comprising a pair of annular split rings 10 and 11. The two rings are joined together, in parallel relation to each other, by attachment of the two transversely bent ends 12 and 13 of the ring 10 adjacent the ends of the split ring 11. The rings 10 and 11 are made of wire or any other suitable material having inherent resilient spring action. The adjoining ends of the ring 11 are formed to provide frusto-conical hinge pins 14 and 15. The loupe holder 16 of the loupe supporting member comprises a resilient U-shaped member or yoke having two hinge elements 17 and 18 intermediate its ends. The hinge elements 17 and 18 have openings therein adapted to receive the hinge pins of the ring 11 to form a pivotal connection between the loupe holder and the loupe supporting member. The entire inner portion of the loupe holder is shaped to provide a groove 19 for retaining the periphery of a loupe.

Figure 2:
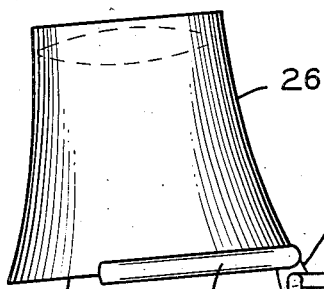
Fig. 2 is a side elevation of the device applied to a loupe and an eyeglass or spectacle frame, showing the loupe in its raised position.
Figure 3:
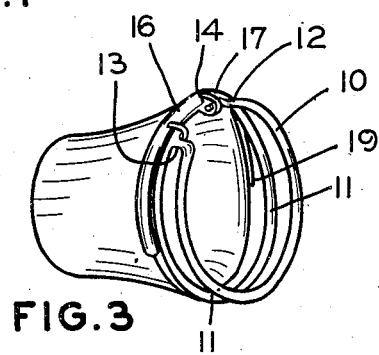
Fig. 3 is a perspective view of the device applied to a loupe.

In the use of the novel loupe supporting member, it is attached to a loupe 26, by inserting the periphery 27 of the loupe in the groove 19 of the resilient loupe holder. The loupe may then be attached to the spectacles by placing the rings 10 and 11 of the loupe supporting member over the spectacle lens, the ring 10 coming behind the lens and the ring 11 in front thereof, and the members 12 and 13 of the ring 10 resting on the spectacle lens or rim. The rings 10 and 11 may be bent inwardly to securely hold the loupe firmly in position, a feature desirable where toric lenses are used in the spectacles. Thus, the loupe is securely held in position on the spectacle lens. It is not necessary to remove the loupe when it is not to be used, due to the pivotal connection of the holder 16 to the loupe supporting member which permits the loupe to be moved to the position shown in Fig. 2. The hinge pins 14 and 15, due to their frusto-conical formation and the contractive pressure exerted by the resilient spring action of the ring 10, press against the hinge elements 17 and 18 of the loupe holder and frictionally hold the loupe holder in any position desired along its arcuate path of movement. This pivotal connection also permits the loupe holder 16 to be readily detached from the loupe supporting member and a similar loupe of variant magnification inserted in the loupe holder. This replacement of the loupe is accomplished by expanding the loupe supporting member to an extent necessary to free the loupe holder from the hinge pins and by inserting another loupe in the loupe holder.

Figure 4:
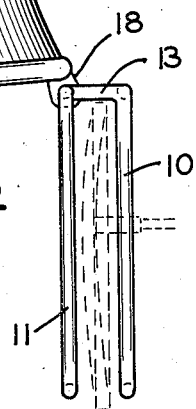
Fig. 4 is a perspective view of a modified loupe holder and the supporting means of Figs. 1 to 3, the parts being shown in disassembled relation.
Figure 4:
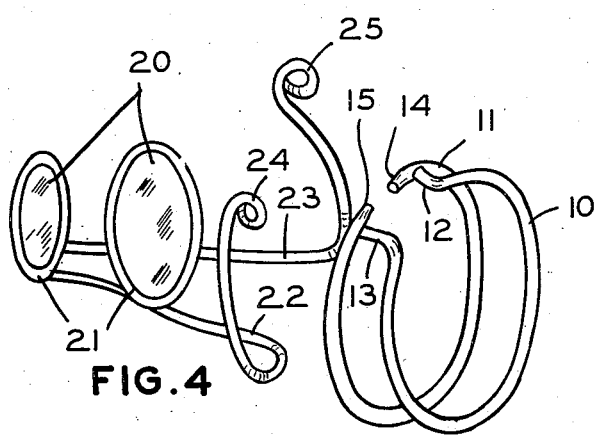
Figure 5:
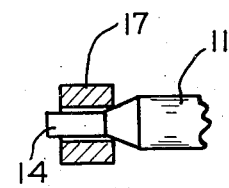
Fig. 5 is a sectional view taken on the lines 5—5 of Fig. 1.

It should also be obvious that a loupe such as shown in Fig. 4 can be used with the supporting member of the present invention. This loupe comprises a pair of magnifying lenses 20 held in frames or rims 21 and a pair of supports or arms 22 and 23. The arms 22 and 23 extend horizontally outward and arcuately upward from the rim 21, having hinge elements or loops 24 and 25 at their extremities, as shown. The arcuately shaped portions of the arms form depending contacting surfaces for the split ring 11. The loops 24 and 25 are adapted to receive the ends 14 and 15 of the ring 11 for pivotal movement thereon. Although the loupe has been shown with two magnifying lenses, it may be readily appreciated that a loupe of the form shown in Fig. 4 may be used with a single magnifying lens.

It will be realized from the foregoing that I have attained the aims and objects of my invention by providing a loupe supporting attachment for spectacles, that not only allows a loupe to be pivotally and detachably connected to a spectacle lens but permits the loupe to be held in a position overlying the eye of the user.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

I claim:

1. A device for detachably securing to a spectacle lens a magnifier having a holder, said device comprising a pair of split rings, the ends of one ring being secured adjacent the respective end portions of the other ring, the two rings lying in substantially parallel planes whereby the device may be placed over a spectacle lens, and means for hingedly mounting the holder on the ends of the other ring whereby the magnifier will be hingedly supported by the detachable holder on the spectacle lens.

2. A device for detachably securing a magnifier having a holder, to a spectacle lens, said device comprising a split ring of resilient material, means for hingedly mounting the magnifier holder between the ends of the ring, the resilience of the ring serving to hold the parts in operative position, and a member spaced from and substantially parallel to the ring and connected thereto by an offset portion whereby the device may be supported by a spectacle lens.

3. A device for detachably securing to a spectacle lens a magnifier having a holder, said device comprising a split ring, a pair of spaced, apertured hinge elements carried by the holder, the ends of the ring being positioned, respectively, in the apertures of the elements whereby the holder is hingedly connected to the ring, and a second split ring spaced from the first-named ring, the end portions of the second ring extending at substantially right angles from the plane thereof, said end portions being secured adjacent the respective ends of the first-named ring whereby the device may be supported over the edge of the spectacle lens.

RAYMOND F. E. STEGEMAN.